Oct. 23, 1956     B. STAHMER     2,767,752
ROTATING FEED CHUTE SLICER Filed Nov. 18, 1950     7 Sheets-Sheet 1

INVENTOR.
BERNHARDT STAHMER.
BY

Oct. 23, 1956 B. STAHMER 2,767,752
ROTATING FEED CHUTE SLICER
Filed Nov. 18, 1950 7 Sheets-Sheet 2

INVENTOR.
BERNHARDT STAHMER.
BY

Oct. 23, 1956　　　　　　B. STAHMER　　　　　　2,767,752
ROTATING FEED CHUTE SLICER
Filed Nov. 18, 1950　　　　　　　　　　　　　7 Sheets-Sheet 3

Inventor
BERNHARDT STAHMER.
By
Attorney

Oct. 23, 1956  B. STAHMER  2,767,752
ROTATING FEED CHUTE SLICER
Filed Nov. 18, 1950  7 Sheets-Sheet 4

Inventor
BERNHARDT STAHMER.
Attorney

Oct. 23, 1956 B. STAHMER 2,767,752
ROTATING FEED CHUTE SLICER
Filed Nov. 18, 1950 7 Sheets-Sheet 5

Inventor
BERNHARDT STAHMER.
By A. Hiram Sturges
Attorney

Oct. 23, 1956

B. STAHMER

2,767,752

ROTATING FEED CHUTE SLICER

Filed Nov. 18, 1950

Inventor
BERNHARDT STAHMER.
By *A. Hiram Sturges*
Attorney

Oct. 23, 1956 — B. STAHMER — 2,767,752
ROTATING FEED CHUTE SLICER
Filed Nov. 18, 1950 — 7 Sheets-Sheet 7

Inventor
BERNHARDT STAHMER.
By A. Hiram Sturges
Attorney

United States Patent Office 2,767,752
Patented Oct. 23, 1956

2,767,752

ROTATING FEED CHUTE SLICER

Bernhardt Stahmer, Omaha, Nebr.

Application November 18, 1950, Serial No. 196,371

9 Claims. (Cl. 146—78)

This invention relates to slicing machines of the type having movably mounted feed chutes.

Attempts have been made in the past to construct a slicing machine having a knife carrier rotating in a horizontal plane and yet cutting a corrugated, criss-cross type of chip. Such machines have had reciprocating feed chutes in order to present a potato to a rotating slicing knife at two different cutting positions and have, for this reason, been too slow to compete with flat-chip cutting machines.

It is an object of my invention to provide a machine having one or more feed chutes mounted on a rotatable carrier which latter is cooperatively disposed with respect to, and synchronized with, a knife carrying rotor whereby the knives of the rotor pass across downwardly opening outlets of the feed chutes to cut slices from objects in the chutes.

Another object of my invention is to provide a machine as described having corrugated knife blades, the machine being arranged and constructed in a manner whereby two slices are cut at each chute as the chute passes over the rotor, the slices being of criss-cross corrugated construction.

A further object of the invention is to provide a machine as above described so constructed as to cut slices of criss-cross, corrugated and perforated construction.

Still another object is to provide a corrugated slice cutting machine as above described in which knives pass by the chute without cutting at positions in which cutting is unwanted.

Still a further object of the invention is to provide a corrugated slice cutting machine as above described in which unwanted slicing is avoided by selectively positioning the knives on the rotor in a manner whereby no knife passes a chute opening, in positions in which cutting is unwanted.

Yet another object is to provide a machine which is capable of cutting a slice having the corrugations on one side extending at a right angle with respect to the corrugations on the other side.

Still another object is to provide a machine as above described which can produce slices having arcuate ridges and furrows by having a chute and a knife radius of unequal length.

Yet another object of the invention is to provide a device for the purpose described which is sturdy and durable in construction, reliable and efficient in operation, and relatively simple and inexpensive to manufacture, assemble and utilize.

A further object of the invention is to provide a knife mounting rotatably disposed on a swingable rotor whereby a knife in the mounting can be presented to a feed chute at any desired angle.

Other and further objects and advantages of the present invention will be apparent from the following detailed description and claims and are illustrated in the accompanying drawings which, by way of illustration, show the principles of the invention and a mode in which I have contemplated applying those principles.

Other embodiments of the invention embodying the same or equivalent principles may be used and structural changes may be made as desired by those skilled in the art without departing from the present invention and the purview of the appended claims.

Figure 1:
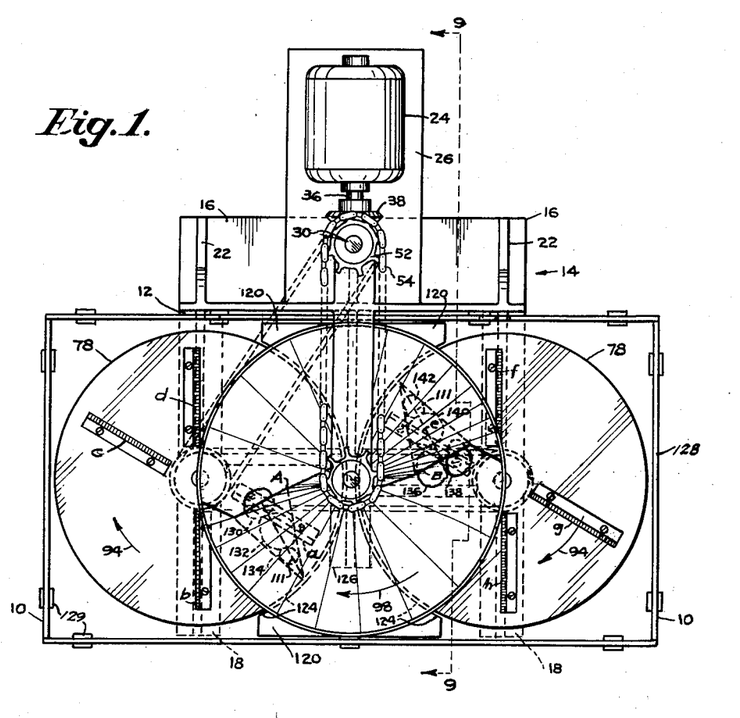
Figure 1 is a top plan view of a new potato slicer including an electrical motor and other driving mechanism; the chutes, certain knives, portions of the knife carrying rotors, and portions of the drive chains being shown in dotted lines. The dotted lines indicating the feed chutes in Figure 1 indicate the inside of the outlet openings thereof.
Figure 5:
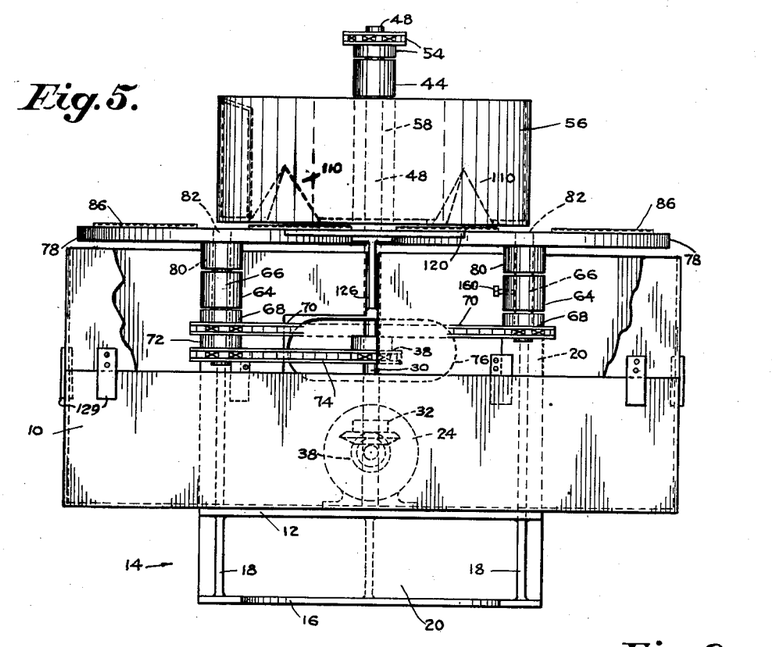
Figure 5 is a frontal elevation of the slicing machine of this invention. A portion of one of the sprocket chains of the invention is shown in dotted lines together with the motor and other portions.
Figure 9:
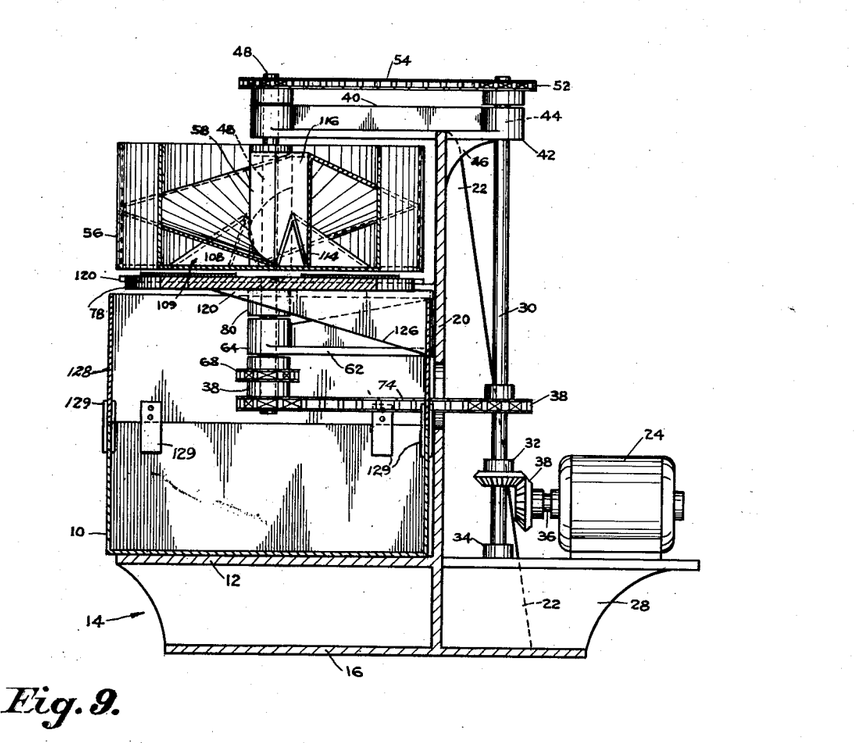
Figure 9 is a view-in-section taken substantially along the line 9—9 of Figure 1.

Referring to the drawings for a more detailed description and particularly to Figures 1, 5 and 9, a removable elongated rectangular potato chip receiving pan 10 is disposed on an upper horizontal plate 12 of a platform 14.

The platform 14 has a lower plate 16 spaced beneath the upper plate 12. Two spaced apart parallel vertical ribs 18 are welded or otherwise suitably secured between the upper plate 12 and the lower plate 16.

A vertically disposed wallplate 20, located in back of the pan 10, is welded at its lower end to the rear of the upper plate 12 and to the lower plate 16.

Two spaced apart vertical webs 22, welded in a position abutting the back side of the wallplate 20, extend down the wall 20 and are welded at their lower ends to the lower platform plate 16 for providing the wall 20 with a firm support.

An electric motor 24, spaced apart from the wallplate 20, is securely mounted upon a horizontal shelf 26. The shelf 26 is welded at its inner end to the backside of the wallplate 20 on a level with the upper platform plate 12.

A web 28, welded between the shelf 26 and the lower platform plate 16, provides the shelf with firm support.

A vertical shaft 30, provided with a gear 32 secured near its lower end, is disposed between the motor 24 and the wallplate 20.

The lower end of the shaft 30 is disposed in an annular bearing block 34, which latter is secured to the upper surface of the shelf 26.

The shaft 36 of the electric motor 24 is provided with a gear 38 disposed in mesh with the gear 32 of the shaft 30. A sprocket wheel 38, secured to the shaft 30, is spaced above the gear 32 for reasons later described.

At the top of the machine, a horizontal beam 40 is provided, having at each end an integrally formed bearing blocks 42, which latter have vertically disposed apertures 44.

The upper end of the shaft 30 is disposed through, and protrudes upwardly from, one of the apertures 44. The other bearing block 42 is disposed directly over the center of the pan 10.

The beam 40 is disposed at a right angle with respect to the upper edge of the wallplate 20 and is welded thereto. A curved reinforcing web 46 is welded against the backside of the wallplate 20 and to the underside of the beam 40 to further hold the beam 40 in position.

A short vertical shaft 48, provided with a sprocket wheel 50 secured to its upper end, is disposed through the outer bearing block aperture 44 and extends downwardly therefrom.

The upper end of the shaft 30 is also provided with a sprocket wheel 52; and a sprocket chain 54 connects the two sprocket wheels 50 and 52.

A circular feed chute carrier or feed hopper 56, provided with a centrally located vertical hub 58 and a horizontal bottom, is disposed and spaced above the pan 10.

Figures 6, 7, 8:
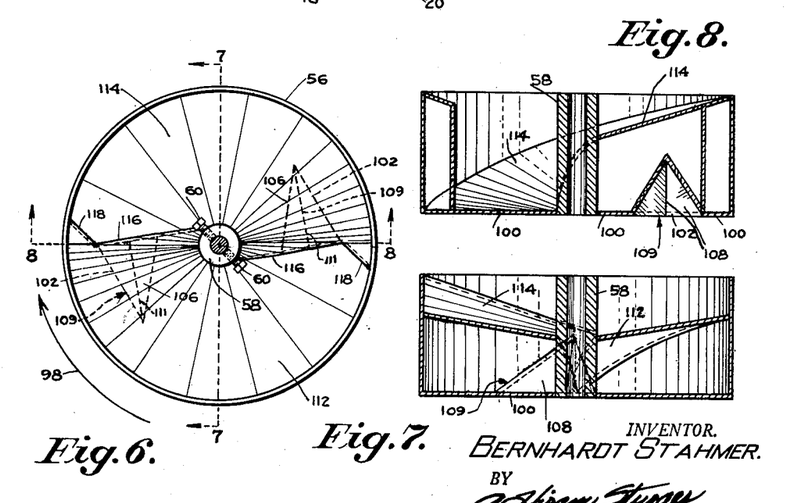
Figure 6 is a top plan view of the rotating feed chute carrier or feed hopper of the invention, the chutes being shown in dotted lines.
Figure 7 is a view-in-section taken along the line 7—7 of Figure 6.
Figure 8 is a view-in-section taken along the line 8—8 of Figure 6.

The shaft 48 is disposed within the hub 58 and terminates at the bottom thereof. As best shown in Figure 6, the hub 58 is adjustably secured to the shaft 48 by means of two machine screws 60, which latter are threaded through two horizontal, oppositely disposed, threaded apertures provided in the hub 58. The screws 60 are turned inwardly against the shaft 48 and secure the tub 56 to the said shaft.

A later described knife rotor mechanism is upheld by two horizontal, spaced apart, parallel struts 62. The struts 62 are each welded at one end to the forward face of the wallplate 20 and extend outwardly at a right angle therefrom beneath the feed hopper 56 and over the pan 10.

As best shown in Figure 5, two vertical shafts 66 are disposed one through each bearing block 64. The shafts 66 are each provided with a sprocket wheel 68 secured thereto immediately below the bearing blocks 64.

A horizontally disposed sprocket chain 70 encircles each sprocket wheel 68 and, as shown in Figure 5, the left hand shaft 66 is provided with a further sprocket wheel 72 secured thereto below the sprocket wheel 68. A further sprocket chain 74, disposed through an aperture 76 in the wallplate 20, encircles the lower sprocket wheel 68 and the sprocket wheel 38, which is secured to the shaft 30 as previously described.

Two horizontal, circular, flat knife rotors 78, each having a hub 80 beneath a center aperture 82, are secured one to the upper end of each shaft 66.

Figure 2:
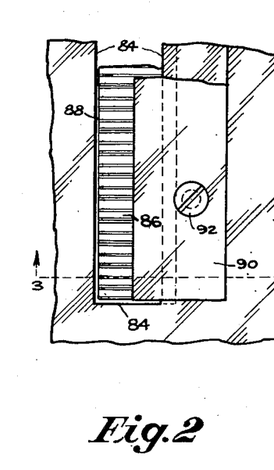
Figure 2 is an enlarged top plan view of a broken away portion of a rotor, showing the way in which a corrugated slicing knife is mounted thereon.
Figure 3:
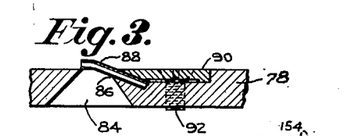
Figure 3 is a view-in-section taken along the line 3—3 of Figure 2.

As best shown in Figures 1, 2, and 3, each rotor 78 is preferably provided with four radially disposed spaced apart slots 84, extending outwardly from points near each rotor's center to points close to its perimeter. The spacing of the slots will be more completely described later.

Elongated corrugated knives 86, disposed overlapping the upper side of each slot 84, are each disposed at an inclination with respect to the plane of rotation of its rotor 78 and each protrudes above the surface of the rotors 78 at its upward cutting edge 88. The outer ends of the knife blades 86 are bent downwardly toward their rotors at an angle of about ten degrees with respect to the remainder of the knife. The rearward portion of the knife blade 86 is preferably disposed at an angle of approximately fifteen degrees with respect to the plane of rotation.

Elongated keeper plates 90, recessed in the upper surface of the rotors 78 and secured by means of two machine screws 92 to the rotors 78, bear down at one edge upon that side of the knife 86 which is opposite the cutting edge 88 for maintaining the knives 86 secured at a cutting angle.

As viewed from the top in Figure 1, the rotors 78 revolve in a clockwise direction as does the feed hopper 56, as shown by the curved arrow lines 94 and 98.

Referring now to the particular construction of the feed hopper 56, best shown in Figures 6, 7, and 8, the bottom wall 100 of the hopper 56 is provided with preferably two oppositely disposed isosceles triangular apertures 101.

The base sides 106 of the triangular apertures 101 are each forwardly disposed with respect to the remainder of the respective apertures. The two remaining longer sides 102 of each aperture 101 are of equal length and converge toward each other meeting at a vertex disposed rearwardly with respect to the direction of rotation from the respective base or forward side 104 of each triangular aperture 101.

As best shown in Figure 8, two feed chutes 109 are provided, one disposed in each of the apertures 101. The feed chutes 109 are rigidly secured to the bottom of the hopper 56 in any suitable manner.

Each feed chute has two triangular walls 107. The walls 107 are provided with preferably flat triangular undersurfaces 108 which converge upwardly toward each other and are joined together above the open inlet 110.

The wall surfaces 108 of each chute join along a straight line 111. Each line 111 is disposed at a right angle with respect to a radius of the feed hopper, which radius crosses the respective line 111 at approximately the area-center of the respective chute. The forward edges of the outlets of the chutes are disposed at a right angle to the lines 111.

The lowermost edges of the outlet of each chute are disposed in a horizontal plane and converge toward each other, as they extend rearwardly with respect to the direction of rotation, to a vertex, to provide a wedge-shaped outlet opening.

The converging surfaces 108 of each chute are disposed opposite the plane of the outlet and are inclinedly disposed with respect to the plane of the outlet. The surfaces 108 form the upper sides of a wedge-like compartment.

Above each inlet 110 of the chutes 109, the leading edge 112 of two oppositely disposed helical ramps 114 are positioned. From their leading edges 112 the helical ramps 114 spiral downwardly in a counterclockwise or counterrotationary direction and terminate on the bottom of the hopper at the inlet 110 of the opposite chute 109.

The feed hopper is provided with two vertical walls 116, one of which is shown in elevation in Figure 8. The walls 116 extend downwardly from the respective edges 112 of the ramp to the bottom surface 100 of the feed outlet 56 and are each disposed around and in the plane of one of the inlets 110 of the respective feed chutes 109.

The walls 116 each slant with respect to a radius of the feed hopper from the outer edge of each feed chute to the respective forwardmost side of the hub 58. The outer ends of each vertical wall 116 join deflection plates or baffle walls 118. The vertical deflection plates 118 are best shown in Figure 6, extend at an angle inwardly from the circular sidewall of the hopper 56 to the vertical wall 116 at the entrance 110 in order to deflect potatoes into the chutes 109.

A floor plate 120 extends in a horizontal plane between the rotors 78. The floor plate 120 is disposed beneath the paths of the chutes 109 to prevent potatoes from falling out of the chutes 109 at times when the chutes are not disposed above the rotors 78.

The upper surface of the plate 120 is preferably disposed in the same plane as the upper surface of the rotor 78. The plate 120 has two opposite arcuate, concave side edges 124 which are each concentric with the respective rotors 78. The curved edges 124 of the floor plates 120 are disposed closely adjacent the outer edges of the rotors 78.

The floor plate 120 is supported by a bracket 126 which has a horizontal upper portion and a vertically disposed under portion. The upper portion of the bracket 126 is secured to the underside of the plate 120 and the rearward end of the bracket 126 is rigidly secured in any suitable manner to the back plate 20.

In operation, the electric motor 24 is set in motion driving the hopper 56 and the two cutting rotors 78 in clockwise directions as seen by the arrows 94 and 98 in Figure 1.

A potato conveyor system, not shown, drops potatoes into the hopper 56 as the hopper 56 is rotating. The potatoes are rapidly thrown to the perimeter of the tub by centrifugal force, sliding and rolling down the inclined ramps 114.

The potatoes enter the chutes 109 and are held there by other potatoes pressing thereagainst at the entrance to the chutes.

The potatoes are prevented from turning and are forced downwardly through the outlets 102 of the chutes 109 by the converging triangular walls 108, the lower side of a lowermost potato being pressed against the upper surfaces of the rotating rotors 78 or against the upper sides of the floor plate 120 and in the paths of the corrugated knives 86.

As best viewed in Figure 1, as the corrugated knives 86 turn under the feed hopper 56, the knives 86 move in an opposite direction to the motion of the chutes 109 and the potatoes, whereby the speed of approach between a knife 86 and a potato in a chute is additive or the sum of the rotational speeds of each, thereby providing great cutting speed.

The machine is provided with a rectangularly arranged guard shield 128 as best seen in Figures 1 and 9. The guard shield 128 has flat wall portions which extend directly upwardly from, and rest on, the front, back and sidewalls of the pan 10. The flat wall portions of the guide 128 are held in place by suitable brackets 129.

The brackets 129 are arranged in pairs, the brackets of a pair being opposite each other and one on each side of the side walls of the pan 10 and guard 128.

The brackets 129 extend downwardly and overlap the adjoining edges of the pan 10 and guard 128. The guard 128 is composed of several sections so that it can be removed from the machine for servicing and cleaning. It has a one-piece front section, two one-piece side sections and a plurality of rear wall sections.

Figure 10:
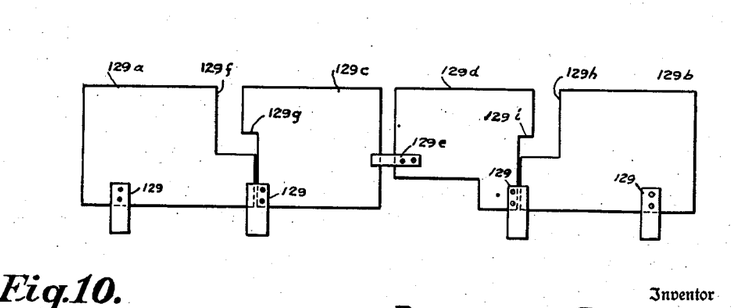
Figure 10 is a frontal elevation of the back side of the guard showing the several sections thereof.

The several rear wall sections are best shown in Figure 10 and include end sections 129a and 129b and center sections 129c and 129d. The sections 129a and 129c share a pair of bracket plates 129, the respective bracket plates 129 overlapping both of these sections and being riveted to the section 129c.

The sections 129b and 129d also share a pair of the brackets 129. This pair of brackets is secured to the section 129b and overlaps the section 129d.

The sections 129c and 129d share a pair of brackets 129e which are riveted to the section 129d and overlap the section 129c. The brackets 129e extend horizontally, however, and overlap vertically adjoining edges of the sections 129c and 129d.

The section 129a is provided with a notch 129f which cooperates with a notch 129g in the sections 129c to provide an opening through which one of the struts 62 extends.

The wall sections 129b and 129d respectively have notches 129h and 129i for receiving the other strut 62. The sections 129c and 129d are spaced apart at all times to provide an opening for reciving the bracket 126 which supports the floor plate 120.

The operation will now be described. Referring to Figure 1, the two feed chutes shown will be designated A and B. The knives on the left hand rotor will be designated a, b, c, and d. The knives on the right rotor are designated e, f, g, and h.

In the rotational position shown in Figure 1, potatoes 130, 132, and 134 are shown in the process of being cut in the feed chute A by a knife a. At the same time potatoes 136, 138, 140, and 142 are being cut in the feed chute B by the knife e.

It will be seen that the inwardmost potatoes are being held in position by the outer potatoes 130, 136, and 138. The potatoes 130, 136, and 138 are in turn held in place by the weight of still further potatoes, not shown, which would be disposed in operation, on the respective ramps 112 and 114.

It will be seen that the motion of the knife a about its axis will tend to cause the furrows made in the potato 132, for example, to have a curvature with a concave side facing the axis of the left hand rotor.

At the same time the rotary motion of the chute A about the chute carrier axis will tend to cause the furrows to have a curvature with their center at the axis of the chute carrier. These two curvatures are equal in the sample machine shown in Figure 1 at the area-centers of the chutes A and B because the area-centers are equidistant from both the carrier axis and from the respective rotor axes.

The two equal curvatures will counteract each other causing the resultant slice to have straight furrows cut at the area-centers of the chutes. Slightly curved furrows will be cut at other points in the chutes.

The amount of curvature of cut in other portions of the chute outlet is so small as to be negligible because of the small size of a slice relative to the distance from the respective axes and because of the above-mentioned counteraction.

Figure 4:
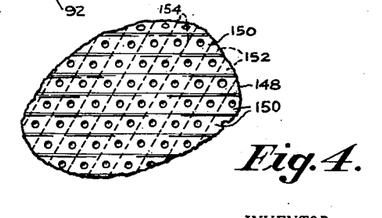
Figure 4 is a top plan view of a potato chip or the like as cut by the machine shown in Figure 1.

The chip 148 formed has substantially straight furrows from this cut as seen at 150 in Figure 4 although these slight curvatures mentioned would be magnified if the distances from the chute to the respective axes, at the place of cutting, were at minimum.

The chute A is not passed by another knife until the knife d meets it. A line between the axes of the left hand rotor 78 and of the chute carrier 56 would be approximately equi-distant from the two positions of the chute A when being cut by the knives a and b. This is accomplished by having the knives a and b spaced apart as shown.

When the knife b makes its cut, the chute A will have been turned to a new position causing the furrows 152 formed by the knife b to be angularly disposed with respect to the furrows 150 cut by the knife a. The size of the angle between the furrows 150 and 152 is in proportion to the dimensions of the machine.

It will be seen that the chips 148 can be cut sufficiently thin for the furrows 150 and 152 to intersect causing the formation of rows of perforations 154 through the chips.

It will be seen that similar chips will be cut at the chute A by the knives g and f of the right hand rotor.

The capacity of the machine is doubled by having the chute B at which similar chips are cut by the knives e, h, c, and b in sequence.

If one of the rotors is held stationary, as by removing the drive chain 70, chips can also be successfully cut. To hold the right hand rotor stationary, a lock bolt 160 can be set into the shaft 66. The bolt 160 is threadedly mounted through the right hand bearing block 64. Many other ways of mounting a knife in stationary position could also be used.

If, for example, the knife e is held in stationary position at the place shown in Figure 1, and the only knife on the left hand rotor is the knife a, then a criss-cross of the furrows on the opposite sides of a chip is possible.

If each rotor has only one knife and there is but one chute, then criss-cross cutting would occur if the knives were synchronized to cut at two chute positions provided the positions were disposed one on each rotor and on the same side of a line between the axes of the rotors and chute carrier.

It will also be seen that with only one rotor and the chute carrier, that criss-cross cutting in two positions would occur if the positions were above and below a line between the axes, and if the rotor, having but one knife, rotated faster than the chute carrier in order to cut in these positions.

Also, if a single rotor had two knives it could cut in these positions, above and below the line of axes. This would be the same as leaving out the right hand rotor in the machine shown in Figure 1. The second chute could then be used or not, as desired, although two more knives on the single rotor would be needed for the second chute.

Figure 14:
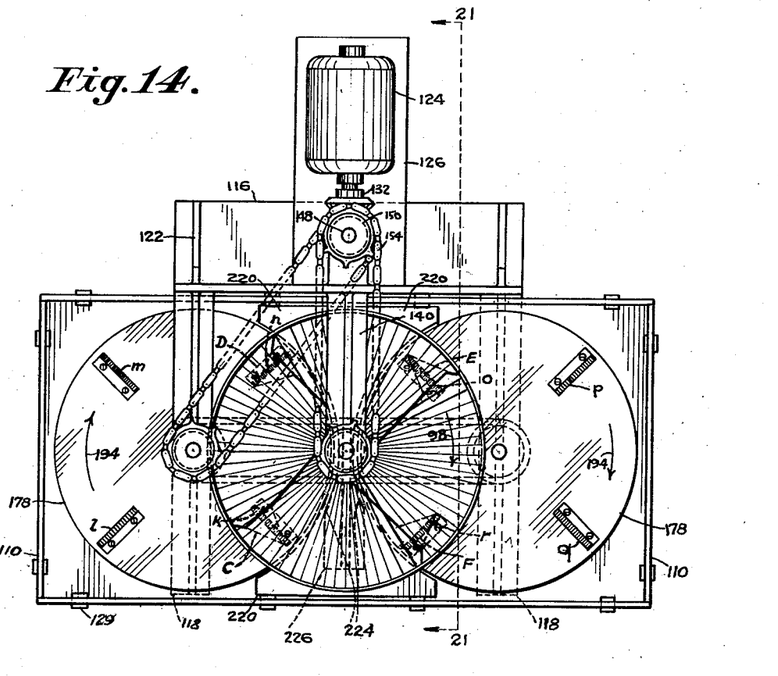
Figure 14 is a top plan view of a modification of the potato slicer of Figure 1. The number of chutes used in this modification increased somewhat within space limits although the dimensions of the machine must be larger to accommodate more chutes. The chutes, certain knives, portions of the knife carrying rotors, and portions of the drive chains are shown in dotted lines. The dotted lines which indicate the feed chutes in Figure 14 are the lines of the inside of the outlet openings.

Another modification of the machine is shown in Figure 14, in which as many feed chutes can be used as desired although the size and cost of the machine would be greater for the greater numbers of feed chutes.

The construction of the rotors, knives, chutes and other parts of the machine of Figure 14 is the same as for the machine of Figure 1, except for size and in the numbers of rotors and knives. For this reason the parts in Figures 14 to 23 have numerals exactly one hundred units higher than the numerals of the corresponding parts in Figures 1 to 9, although the letter designation of the chutes and knives are different. For this reason these construction details will not be again described.

Figures 15, 16, 17:
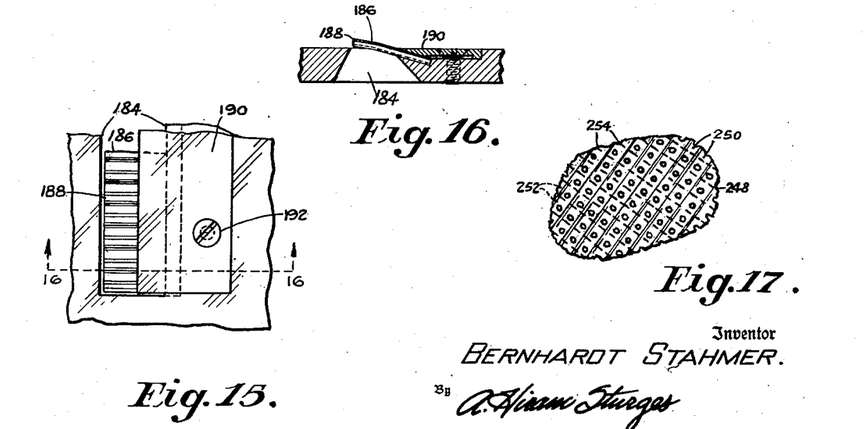
Figure 15 is an enlarged top plan view of a broken away portion of a rotor, showing the way in which a corrugated slicing knife is mounted thereon.
Figure 16 is a view-in-section taken along the line 16—16 of Figure 15.
Figure 17 is a top plan view of a potato chip or the like as cut by the machine shown in Figure 14.
Figure 18:
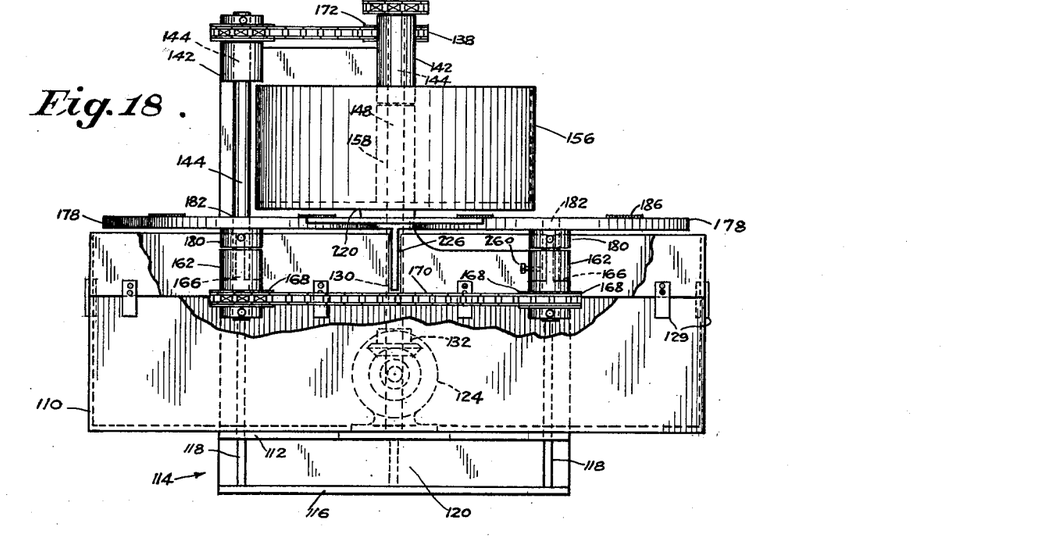
Figure 18 is a frontal elevation of the slicing machine of this invention. A portion of one of the sprocket chains is shown in dotted lines together with the motor and other portions.
Figure 19:
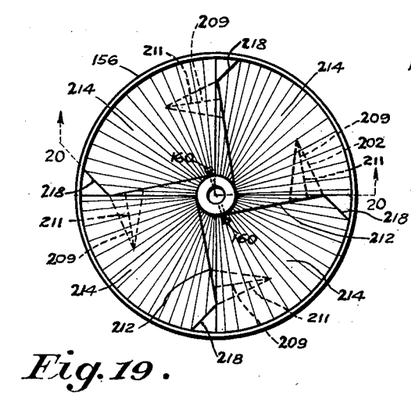
Figure 19 is a top plan view of the rotating feed chute carrier or feed hopper of the invention, the chutes being shown in dotted lines.
Figure 20:
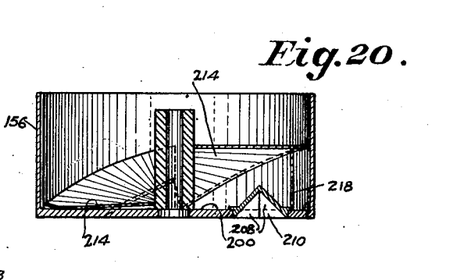
Figure 20 is a view-in-section taken along the line 20—20 of Figure 19.
Figure 21:
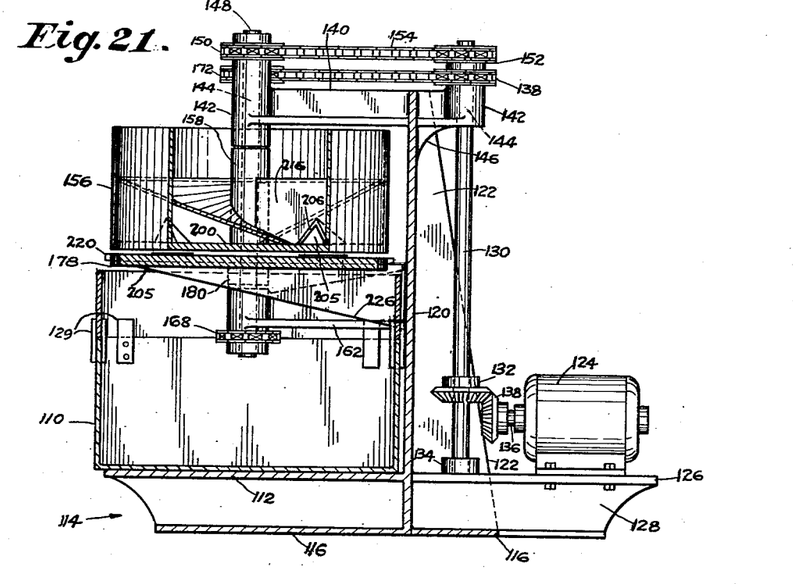
Figure 21 is a view-in-section taken along the line 21—21 of Figure 14.
Figure 22:
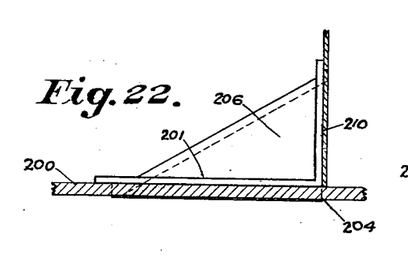
Figure 22 is an enlarged detailed view of a feed chute as seen from the side, broken away portions of the chute carrier bottom and of the wall in front of the chute being shown in section.
Figure 23:
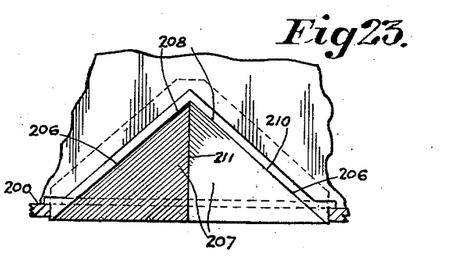
Figure 23 is a view looking at Figure 22 from the right hand side thereof.

A further exception is that the potato chip shown in Figure 17 has the furrows 250 and 252 on its two sides disposed at approximately ninety degrees with respect to each other.

Referring to Figure 14, four feed chutes C, D, E and F are shown on the feed chute carrier or feed hopper 156. These chutes are equi-distantly spaced apart.

Each motor 178 has four equidistantly spaced apart knives k, l, m, n and o, p, q, r, respectively, radially disposed thereon.

Four cutting positions are shown in Figure 14. It will be seen that a chip will be cut at each chute and at each of these four cutting positions during each revolution of the chute carrier 156 as the knives are synchronized with the chutes.

The area-center of each feed chute at the place of cutting is approximately equidistant from the axes of its carrier and the cutting rotor. The cuts are therefor substantially straight, forming furrows 250 and 252 on opposite sides of the chips 248.

The furrows 250 and 252 are disposed at substantially a right angle with respect to each other because the chutes in successive cutting positions are disposed at substantially a right angle to each other.

As the chutes pass across a line between the axes of the rotors 178 and the chute carrier 156, they pass by the knives without cutting taking place. This by-pass arrangement makes possible, subject to change in size of the machine, the use of unlimited numbers of feed chutes and knives.

In addition to the above arrangements changes in dimensions can make further differences. The chute carriers 56 and 156 can be made larger to place the chutes much further from their axes than the knives are from their own axes. This will result in chips 148 having arcuate furrows 150 and 152. If the chutes extend past the axes of the rotor then cutting can occur on the opposite sides of the rotor axes from the chute carrier axis, provided the knives and rotors are correspondingly synchronized for cutting.

The machine shown in Figure 14 will cut sixteen chips in each revolution of the feed hopper 56.

This invention has provided a slicing machine for slicing potatoes and other foodstuffs capable of cutting slices more rapidly than heretofore, of cutting criss-cross slices and cutting criss-cross slices having perforations.

Figure 11:
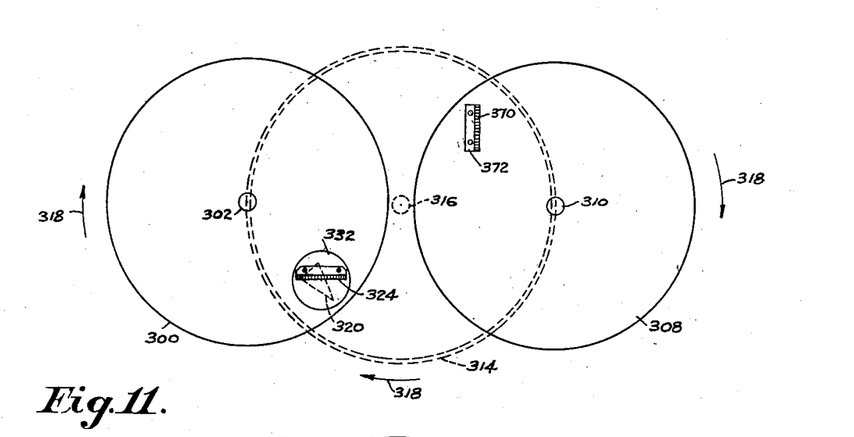
Figure 11 is a diagrammatic top plan view of a modification showing two rotors and the feed chute carrier, the feed chute carrier being shown in dotted lines. The view is for the purpose of showing the principle of a machine having a different arrangement of cutting knives and also for showing an adjustable mounting for a knife. The feed chute carrier is shown in dotted lines and has one feed chute also shown in dotted lines. The drive chains and other parts of the machine are not shown in Figure 11. A left hand rotor has an adjustable knife. The right hand rotor has a stationary knife set at a preferred angle.

In Figure 11 a diagrammatic top plan view of a modification of the invention is shown. A left-hand rotor 300 having an axle 302 is disposed opposite a rotor 308 mounted on a parallel axle 310.

Between the rotors 300 and 308 a feed chute carrier 314 is shown in dotted lines, having an axle 316 in parallelism with the axles 302 and 310. The rotors 300 and 308 and the feed chute carrier 314 are rotated clockwise as indicated by the arrows 318.

Except for the positions of knives and a feed chute now to be described, the other parts of the machine in Figure 11 are similar to those shown in Figure 1 and it is believed unnecessary to repeat the same.

A feed chute outlet opening 320 is shown in dotted lines on the carrier 314 and a corrugated cutting blade 324 is shown in the process of making a cut across the outlet of the feed chute 320. The forward edge of the knife 324 is disposed in a line in parallelism with the axes 302 and 316 so that the parallel ridges of the blade 324 will be disposed in parallelism with the effective direction of the cut.

By effective direction of cut is meant the direction in which the cut is made across the potato in the feed chute 320. As explained earlier, the knife tends to make a curved cut about its axis and the chute movement tends to make a curved cut about its axis. These two curves offset each other producing a cut which is substantially a straight line extending at a right angle to a line between the axes 302, 316, and 310. This is true only in the situation in which the area-center of the feed chute is approximately equidistant from the corresponding rotor axis and feed chute carrier axis at the time of cutting, as explained earlier.

Figure 12:
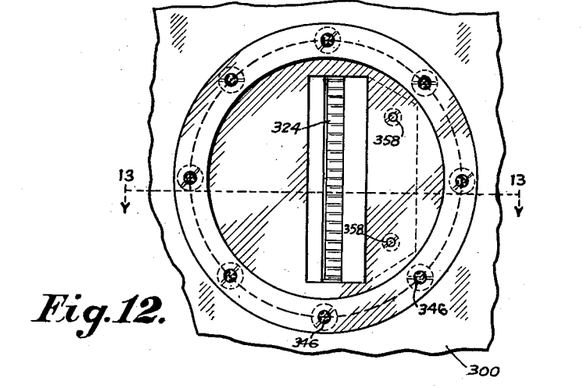
Figure 12 is an enlarged bottom plan view broken away portion of the left hand rotor of Figure 11 around the adjustable knife mounting plate.
Figure 13:
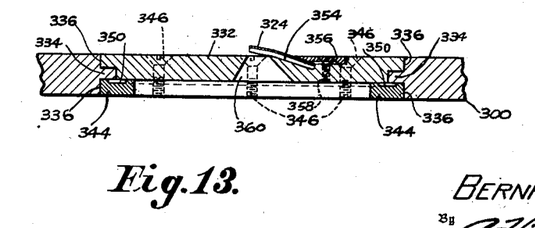
Figure 13 is a view-in-section taken along the line 13—13 of Figure 12, the view being turned right side up so that the cutting edge of the knife is disposed upwardly.

The knife 324 is mounted in a circular holding plate 332 which latter is upheld on a circular ledge 334 which protrudes inwardly from the perimeter of a circular hole 336 in the rotor 300.

On the underside of the plate 332 a circular ring 344 is disposed. The ring 344 is adapted to clamp against the underside of a circular ledge 334 and extends inwardly therefrom against a portion of the underside of the plate 332.

The ring 344 is held in place by means of screws 346 which are preferably placed around the circumference of the ring 344. Each ring 346 extends downwardly through the plate 332 for drawing the ring 344 tightly and upwardly thereagainst.

The ring 344 is provided with a circular recess 350 in the upper side thereof. The excess extends inwardly from a point adjacent the outer perimeter of the ring to a point spaced inwardly from the inner perimeter of the ring 344. The purpose of the recess 350 is to cause a maximum pressure to be asserted against the underside of the ledge 334 rather than to have a part of the pressure offset by the excessive engagement with the plate 332 itself. The knife 324 is similar to the knife 88 of Figure 1 and will not be described further.

It is mounted in a downwardly and rearwardly inclining recess 354 in the plate 332. The knife 354 is held in place by a clamping member 356 which is similar in all respects to the clamping member 90 of Figure 3, with the exception that the ends of the member 356 are tapered inwardly as best seen in dotted lines in Figure 12 to avoid engagement with the screws 346. The clamping member 90 is itself held in place by screws 358 which extend downwardly into the clamping member 356 into the plate 352.

It will be seen that when it is desired to change the angular position of the cutting edge of the knife 324 the circular plate 332 can be rotated a complete 360 degrees if desired, first loosening and afterwards tightening the screws 346.

The plate 332 has a slot 360 therethrough beneath the cutting edge of the knife 324. The slot 360 has downwardly and outwardly slanting side walls giving the underside of the slot a greater area than the upper side.

In Figure 11, the right hand rotor 308 is also provided with a knife 370 held down by a clamp 372 similar to the clamp 356. The outer end of the forward cutting edge of the knife 370 is inclined forwardly from a radial position for the purpose of cutting across the outlet of the feed chute 320 when the ridge of the corrugated knife 370 is disposed at the time of cutting in parallelism with the effective direction of cut across the potato.

The purpose of the showing of the permanently mounted knife 370 in this position is to illustrate that the particular non-radial position of the knife 370 is my invention and can be practiced independently of the rotatable mounting 332.

It is important that the one or more feed chutes of the machine travel in a continuously progressive movement in what will be defined as a Stahmer path. A reciprocating or alternately retrogressive movement is less adapted to high speed and is more subject to wear.

A Stahmer path is a closed path with the chute returning periodically to a starting point. A Stahmer path is such that the outlet of the chute is always disposed downwardly of its inlet for gravity feed.

Another characteristic of a Stahmer path is that it has at least two sections disposed at an angle with respect to each other. Successive cutting occurs when the chute is positioned at first one and then the other of these sections, resulting in a criss-cross chip having the corrugations on one side disposed angularly to the corrugations on the other side.

In other words, the potato in feed chute A is being cut, as shown in Figure 1, in the third quadrant of the carrier 56 by the knife a.

It will be next cut in the fourth quadrant of carrier 56 by the knife d.

From the foregoing description, it is thought to be obvious that a rotating feed chute slicer constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A machine for slicing sliceable objects comprising: a frame, a feed chute carrier mounted on said frame and rotatable in a substantially horizontal plane about a substantially vertical axis, said carrier having a bottom horizontally disposed and having an annular side wall upwardly extending from said bottom and secured thereto to receive potatoes therein, at least one feed chute on said carrier and spaced a certain radial distance from said axis, said chute having an inlet and an outlet, said outlet opening downwardly and terminating in a plane in parallelism with the plane of rotation of said carrier, said inlet being disposed forwardly of said chute with respect to the direction of rotation, said outlet having two edges converging toward each other as the rearward end of said chute is approached to form a wedge-shaped opening pointing rearwardly, said chute having at least two wall surfaces disposed opposite and above said outlet, said wall surfaces being inclinedly disposed with respect to each other both as seen in horizontal cross section and in vertical cross section, said wall surfaces being disposed converging toward each other and toward the plane of said outlet at their rearward ends; downwardly inclined spiral-like ramp means attached to said feed chute carrier and disposed on the inside of said sidewall means for delivering potatoes to said inlet; at least one knife rotor rotatably mounted on said frame and rotating in a direction similar to said carrier and disposed closely underlapping said carrier, said rotor rotating about an axis in parallelism with the axis of said chute carrier, the rotor axis being spaced from the axis of the carrier at least substantially the radial distance of said feed chute from said carrier axis; a plurality of slicing knives on said rotor, said knives having elongated corrugated cutting edges, said knives and the rearward ends of said chutes rotating in directions generally toward each other during cutting; co-related drive means mounted on said frame and connected to and driving said carrier and rotor in continuous rotation and synchronization, a slice is cut from an object at said chute in each of two chute positions as said chute passes across said rotor, said positions being disposed such that the area-center of said chute outlet is disposed on opposite sides of a line through the axes of said carrier and rotor at times of cutting at said positions respectively, said chute passing alongside and bypassing at least one of said knives between the passage of said chute from one of said cutting positions to the other, said slices each having the opposite sides thereof corrugated with the corrugations on one side extending angularly with respect to the corrugations on the other side; and support means having a generally horizontally extending surface disposed closely spaced from and beneath said rotating feed chute carrier and horizontally aligned with and positioned closely adjacent to said rotor for supporting said objects in said chute when said chute is not disposed above said rotor.

2. A machine for slicing sliceable objects comprising:

a frame, a feed chute carrier mounted on said frame and rotatable in a substantially horizontal plane about a substantially vertical axis, said carrier having a bottom horizontally disposed and having an annular side wall upwardly extending from said bottom and secured thereto to receive potatoes therein, at least one feed chute on said carrier and spaced a certain radial distance from said axis, said chute having an inlet and an outlet, said outlet opening downwardly and terminating in a plane in parallelism with the plane of rotation of said carrier, said inlet being disposed forwardly of said chute with respect to the direction of rotation, said outlet having two edges converging toward each other as the rearward end of said chute is approached to form a wedge-shaped opening pointing rearwardly, said chute having at least two wall surfaces disposed opposite and above said outlet, said wall surfaces being inclinedly disposed with respect to each other both as seen in horizontal cross section and in vertical cross section, said wall surfaces being disposed converging toward each other and toward the plane of said outlet at their rearward ends; downwardly inclined spiral-like ramp means attached to said feed chute carrier and disposed on the inside of said sidewall means for delivering potatoes to said inlet; at least one knife rotor rotatably mounted on said frame and rotating in a direction similar to said carrier and disposed closely underlapping said carrier, said rotor rotating about an axis in parallelism with the axis of said chute carrier, the rotor axis being spaced from the axis of the carrier at least substantially the radial distance of said feed chute from said carrier axis; a plurality of slicing knives on said rotor, said knives having elongated corrugated cutting edges, said knives and the rearward ends of said chutes rotating in directions generally toward each other during cutting; co-related drive means mounted on said frame and connected to and driving said carrier and rotor in continuous rotation and synchronization; a slice is cut from an object at said chute in each of two chute positions as said chute passes across said rotor, said positions being disposed such that the area-center of said chute outlet is disposed on opposite sides of a line through the axes of said carrier and rotor at times of cutting at said positions respectively, said chute being passed by only two of said knives in each passing over said rotor, said slices each having the opposite sides thereof corrugated with the corrugations on one side extending angularly with respect to the corrugations on the other side; and support means having a generally horizontally extending surface disposed closely spaced from and beneath said rotating feed chute carrier and horizontally aligned with and positioned closely adjacent to said rotor for supporting said objects in said chute when said chute is not disposed above said rotor.

3. A machine for slicing sliceable objects comprising: a frame, a feed chute carrier mounted on said frame and rotatable in a substantially horizontal plane about a substantially vertical axis, said carrier having a bottom horizontally disposed and having an annular side wall upwardly extending from said bottom and secured thereto to receive potatoes therein, at least one feed chute on said carrier and spaced a certain radial distance from said axis, said chute having an inlet and an outlet, said outlet opening downwardly and terminating in a plane in parallelism with the plane of rotation of said carrier, said inlet being disposed forwardly of said chute with respect to the direction of rotation, said outlet having two edges converging toward each other as the rearward end of said chute is approached to form a wedge-shaped opening pointing rearwardly, said chute having at least two wall surfaces disposed opposite and above said outlet, said wall surfaces being inclinedly disposed with respect to each other both as seen in horizontal cross section and in vertical cross section, said wall surfaces being disposed converging toward each other and toward the plane of said outlet at their rearward ends; downwardly inclined spiral-like ramp means attached to said feed chute carrier and disposed on the inside of said sidewall means for delivering potatoes to said inlet; at least one knife rotor rotatably mounted on said frame and rotating in a direction similar to said carrier and disposed closely underlapping said carrier, said rotor rotating about an axis in parallelism with the axis of said chute carrier, the rotor axis being spaced from the axis of the carrier at least substantially the radial distance of said feed chute from said carrier axis; a plurality of slicing knives on said rotor, said knives having elongated corrugated cutting edges, said knives and the rearward ends of said chutes rotating in directions generally toward each other during cutting; co-related drive means mounted on said frame and connected to and driving said carrier and rotor in continuous rotation and synchronization; a slice is cut from a object at said chute in each of two chute positions as said chute passes across said rotor, said positions being disposed such that the area-center of said chute outlet is disposed on opposite sides of a line through the axes of said carrier and rotor at times of cutting at said positions respectively, said slices each having the opposite sides thereof corrugated with the corrugations on one side extending angularly with respect to the corrugations on the other side; and support means having a generally horizontally extending surface disposed closely spaced from and beneath said rotating feed chute carrier and horizontally aligned with and positioned closely adjacent to said rotor for supporting said objects in said chute when said chute is not disposed above said rotor.

4. A machine for slicing sliceable objects comprising: a frame, a feed chute carrier mounted on said frame and rotatable in a substantially horizontal plane about a substantially vertical axis, said carrier having a bottom horizontally disposed and having an annular side wall upwardly extending from said bottom and secured thereto to receive potatoes therein, at least one feed chute on said carrier and spaced a certain radial distance from said axis, said chute having an inlet and an outlet, said outlet opening downwardly and terminating in a plane in parallelism with the plane of rotation of said carrier, said inlet being disposed forwardly of said chute with respect to the direction of rotation, said chute having an upper wall disposed above and spaced from said outlet, said upper wall having at least one undersurface inclinedly disposed with respect to the plane of said outlet and tapering from said inlet downwardly and rearwardly toward said outlet to form a wedge-shaped chute; downwardly inclined spiral-like ramp means attached to said feed chute carrier and disposed on the inside of said sidewall means for delivering potatoes to said inlet; at least one knife rotor rotatably mounted on said frame and rotating in a direction similar to said carrier and disposed closely underlapping said carrier, said rotor rotating about an axis in parallelism with the axis of said chute carrier, the rotor axis being spaced from the axis of the carrier at least substantially the radial distance of said feed chute from said carrier axis; a plurality of slicing knives on said rotor, said knives having elongated corrugated cutting edges, said knives and the rearward ends of said chutes rotating in directions generally toward each other during cutting; co-related drive means mounted on said frame and connected to and driving said carrier and rotor in continuous rotation and synchronization, a slice is cut from an object at said chute in each of two chute positions as said chute passes across said rotor, said positions being disposed such that the area-center of said chute outlet is disposed on opposite sides of a line through the axes of said carrier and rotor at times of cutting at said positions respectively, said chute passing alongside and by-passing at least one of said knives between the passage of said chute from one of said cutting positions to the other, said slices each having the opposite sides thereof corrugated with the corrugations on one side extending angularly with respect to the corrugations on the other side; and support means having a generally horizontally extending surface disposed closely spaced from and beneath said rotating feed chute carrier and horizontally aligned with and positioned closely adjacent to said rotor for supporting said objects in said chute when said chute is not disposed above said rotor.

5. A machine for slicing sliceable objects comprising: a frame, a feed chute carrier mounted on said frame and rotatable in a substantially horizontal plane about a substantially vertical axis, said carrier having a bottom horizontally disposed and having an annular side wall upwardly extending from said bottom and secured thereto to receive potatoes therein, at least one feed chute on said carrier and spaced a certain radial distance from said axis, said chute having an inlet and an outlet, said chute outlet opening downwardly and terminating in a plane in parallelism with the plane of rotation of said carrier, said inlet being disposed forwardly of said chute with respect to the direction of rotation, said chute having an upper wall disposed above and spaced from said outlet, said upper wall having at least one undersurface inclinedly disposed with respect to the plane of said outlet and tapering from said inlet downwardly and rearwardly toward said outlet to form a wedge-shaped chute; downwardly inclined spiral-like ramp means attached to said feed chute carrier and disposed on the inside of said sidewall means for delivering potatoes to said inlet; at least one knife rotor rotatably mounted on said frame and rotating in a direction similar to said carrier and disposed closely underlapping said carrier, said rotor rotating about an axis in parallelism with the axis of said chute carrier, the rotor axis being spaced from the axis of the carrier at least substantially the radial distance of said feed chute from said carrier axis; a plurality of slicing knives on said rotor, said knives having elongated corrugated cutting edges, said knives and the rearward ends of said chutes rotating in directions generally toward each other during cutting; co-related drive means mounted on said frame and connected to and driving said carrier and rotor in continuous rotation and synchronization, a slice is cut from an object at said chute in each of two chute positions as said chute passes across said rotor, said positions being disposed such that the area-center of said chute outlet is disposed on opposite sides of a line through the axes of said carrier and rotor at times of cutting at said positions respectively, said chute being passed by only two of said knives in each passing over said rotor, said slices each having the opposite sides thereof corrugated with the corrugations on one side extending angularly with respect to the corrugations on the other side; and support means having a generally horizontally extending surface disposed closely spaced from and beneath said rotating feed chute carrier and horizontally aligned with and positioned closely adjacent to said rotor for supporting said objects in said chute when said chute is not disposed above said rotor.

6. A machine for slicing sliceable objects comprising: a frame, a feed chute carrier mounted on said frame and rotatable in a substantially horizontal plane about a substantially vertical axis, said carrier having a bottom horizontally disposed and having an annular side wall upwardly extending from said bottom and secured thereto to receive potatoes therein, at least one feed chute on said carrier and spaced a certain radial distance from said axis, said chute having an inlet and an outlet, said outlet opening downwardly and terminating in a plane in parallelism with the plane of rotation of said carrier, said inlet being disposed forwardly of said chute with respect to the direction of rotation, said chute having an upper wall disposed above and spaced from said outlet, said upper wall having at least one undersurface inclinedly disposed with respect to the plane of said outlet and tapering from said inlet downwardly and rearwardly toward said outlet to form a wedge-shaped chute; downwardly inclined spiral-like ramp means attached to said feed chute carrier and disposed on the inside of said sidewall means for delivering potatoes to said inlet; at least one knife rotor rotatably mounted on said frame and rotating in a direction similar to said carrier and disposed closely underlapping said carrier, said rotor rotating about an axis in parallelism with the axis of said chute carrier, the rotor axis being spaced from the axis of the carrier at least substantially the radial distance of said feed chute from said carrier axis; a plurality of slicing knives on said rotor; co-related drive means mounted on said frame and connected to and driving said carrier and rotor in continuous rotation and synchronization, a slice is cut from an object at said chute in each of two chute positions as said chute passes across said rotor, said positions being disposed such that the area-center of said chute outlet is disposed on opposite sides of a line through the axes of said carrier and rotor at times of cutting at said positions respectively, said slices each having the opposite sides thereof corrugated with the corrugations on one side extending angularly with respect to the corrugations on the other side, the corrugations on opposite sides of each slice intersecting each other to provide perforations therethrough; and support means having a generally horizontally extending surface disposed closely spaced from and beneath said rotating feed chute carrier and horizontally aligned with and positioned closely adjacent to said rotor for supporting said objects in said chute when said chute is not disposed above said rotor.

7. A machine for slicing sliceable objects comprising: a frame, a feed chute carrier mounted on said frame and rotatable in a substantially horizontal plane about a substantially vertical axis, said carrier having a bottom horizontally disposed and having an annular side wall upwardly extending from said bottom and secured thereto to receive potatoes therein, at least one feed chute on said carrier and spaced a certain radial distance from said axis, said chute having an inlet and an outlet, said outlet opening downwardly and terminating in a plane in parallelism with the plane of rotation of said carrier, said inlet being disposed forwardly of said chute with respect to the direction of rotation, said chute having an upper wall disposed above and spaced from said outlet, said upper wall having at least one undersurface inclinedly disposed with respect to the plane of said outlet and tapering from said inlet downwardly and rearwardly toward said outlet to form a wedge-shaped chute; downwardly inclined spiral-like ramp means attached to said feed chute carrier and disposed on the inside of said sidewall means for delivering potatoes to said inlet; at least one knife rotor rotatably mounted on said frame and rotating in a direction similar to said carrier and disposed closely underlapping said carrier, said rotor rotating about an axis in parallelism with the axis of said chute carrier, the rotor axis being spaced from the axis of the carrier at least substantially the radial distance of said feed chute from said carrier axis; a plurality of slicing knives on said rotor, said knives having elongated corrugated cutting edges, said knives and the rearward ends of said chutes rotating in directions generally toward each other during cutting; co-related drive means mounted on said frame and connected to and driving said carrier and rotor in continuous rotation and synchronization, a slice is cut from an object at said chute in each of two chute positions as said chute passes across said rotor, said positions being disposed such that the area-center of said chute outlet is disposed on opposite sides of a line through the axes of said carrier and rotor at times of cutting at said positions respectively, said slices each having the opposite sides thereof corrugated with the corrugations on one side extending angularly with respect to the corrugations on the other side; and support means having a generally horizontally extending surface disposed closely spaced from and beneath said rotating feed chute carrier and horizontally aligned with and positioned closely adjacent to said rotor for supporting said objects in said chute when said chute is not disposed above said rotor.

8. A machine for slicing sliceable objects comprising: a frame, a feed chute carrier mounted on said frame and rotatable in a substantially horizontal plane about a substantially vertical axis, said carrier having a bottom horizontally disposed and having an annular side wall upwardly extending from said bottom and secured thereto to receive potatoes therein, at least one feed chute on said carrier and spaced a certain radial distance from said axis, said chute having an inlet and an outlet, said outlet opening downwardly and terminating in a plane in parallelism with the plane of rotation of said carrier, said inlet being disposed forwardly of said chute with respect to the direction of rotation, said chute having an upper wall disposed above and spaced from said outlet, said upper wall having at least one undersurface inclinedly disposed with respect to the plane of said outlet and tapering from said inlet downwardly and rearwardly toward said outlet to form a wedge-shaped chute; downwardly inclined spiral-like ramp means attached to said feed chute carrier and disposed on the inside of said sidewall means for delivering potatoes to said inlet; a pair of knife rotors rotatably mounted on said frame and rotatable in directions similar to said carrier and disposed closely underlapping said carrier, said rotors rotating about axes in parallelism with the axis of said carrier and disposed on opposite sides of said carrier axis, the rotor axes being spaced from the axis of said carrier at least substantially the radial distance of said feed chute from said carrier axis; a slicing knife mounted on each rotor, said knives having corrugated cutting edges, the cutting edges of said knives each passing closely across the outlet of said chute, co-related drive means mounted on said frame and connected to and driving said carrier and rotors so that a slice is cut from one of said objects at said chute in each of two positions, one of said positions being when said chute is above one of said rotor knives on one side of a line between said axes, the other of said positions being when said chute is above the other of said rotor knives on the same side of said line, said slices each having the opposite sides thereof corrugated with the corrugations on one side extending angularly with respect to the corrugations on the other side; and support means having a generally horizontally extending surface disposed closely spaced from and beneath said rotating feed chute carrier and horizontally aligned with and disposed between and spaced closely adjacent to said rotors for upholding said objects in said chute at times when said chute is not above one of said rotors.

9. A machine for slicing sliceable objects comprising: a frame, a feed chute carrier mounted on said frame and rotatable in a substantially horizontal plane about a substantially vertical axis, said carrier having a bottom horizontally disposed and having an annular side wall upwardly extending from said bottom and secured thereto to receive potatoes therein, at least one feed chute on said carrier and spaced a certain radial distance from said axis, said chute having an inlet and an outlet, said outlet opening downwardly and terminating in a plane in parallelism with the plane of rotation of said carrier, said inlet being disposed forwardly of said chute with respect to the direction of rotation, said chute having an upper wall disposed above and spaced from said outlet, said upper wall having at least one undersurface inclinedly disposed with respect to the plane of said outlet and tapering from said inlet downwardly and rearwardly toward said outlet to form a wedge-shaped chute; downwardly inclined spiral-like ramp means attached to said feed chute carrier and disposed on the inside of said sidewall means for delivering potatoes to said inlet; a knife rotor rotatably mounted on said frame and disposed underlapping said carrier, said rotor rotating about an axis in parallelism with the axis of said chute carrier, co-related drive means mounted on said frame and connected to and co-related with both said rotor and said carrier for driving said rotor and carrier continuously in the same rotational directions in synchronization at the same speed, the rotor axis being spaced from the axis of the carrier at least substantially the radial distance of said feed chute from said carrier axis; means for driving said rotor and carrier continuously in the same rotational directions in synchronization at the same speed; at least one slicing knife on said rotor, said knife having a corrugated cutting edge, said knife and the rearward end of said chute rotating in directions generally toward each other during cutting at a first cutting position of said chute; a second corrugated edged cutting knife; means holding said second knife and presenting it to said outlet for cutting at a second cutting position of said chute, said second knife being held in a stationary position with respect to said rotor, said chute and knives being disposed at said cutting positions so that slices cut at said positions have the opposite sides thereof corrugated with the corrugations on one side thereof extending angularly with respect to the corrugations on the other side thereof; and support means having a generally horizontally extending surface disposed closely spaced from and beneath said rotating feed chute carrier and horizontally aligned with and positioned closely adjacent to said rotor for supporting said objects in said chute when said chute is not disposed above said rotor.

References Cited in the file of this patent

UNITED STATES PATENTS

| | | |
|---|---|---|
| 477,377 | Martindale | June 21, 1892 |
| 738,616 | Kollman | Sept. 8, 1903 |
| 1,965,500 | Knott | July 3, 1934 |
| 1,965,501 | Knott | July 3, 1934 |
| 1,972,586 | Etter | Sept. 4, 1934 |
| 2,024,353 | Goodman | Dec. 17, 1935 |
| 2,086,708 | Ferry | July 13, 1937 |
| 2,611,408 | Farmer | Sept. 23, 1952 |

FOREIGN PATENTS

| | | |
|---|---|---|
| 55,029 | Switzerland | Dec. 5, 1910 |
| 342,442 | Germany | Oct. 18, 1921 |
| 513,890 | Germany | Dec. 5, 1930 |
| 295,773 | Italy | Apr. 29, 1932 |
| 476,969 | Great Britain | Dec. 20, 1937 |